Oct. 4, 1966 F. G. DE BRIE PERRY ETAL 3,276,279
VARIABLE RATIO TRANSMISSION
Filed April 24, 1964 4 Sheets-Sheet 1

United States Patent Office 3,276,279
Patented Oct. 4, 1966

3,276,279
VARIABLE RATIO TRANSMISSION
Forbes George de Brie Perry, East Grinstead, Sussex, and Thomas George Fellows, London, England, assignors to National Research Development Corporation, London, England, a corporation of Great Britain
Filed Apr. 24, 1964, Ser. No. 362,521
Claims priority, application Great Britain, May 3, 1963, 17,547/63
17 Claims. (Cl. 74—190.5)

This invention relates to transmission units of the so-called "toroidal race rolling friction" type wherein rollers provide a driving connection between facing toroidal surfaces of an input disc and an output disc the rollers being mounted for rotation about axes which extend in a generally radial direction from, and normally intersect, the rotational axis common to the input and output discs (hereinafter called the "main axis").

Such a transmission unit is described in co-pending Serial Application No. 110,572, now Patent No. 3,153,938.

In a transmission unit of the type described changes of ratio are obtained by changing the angle (hereinafter called the "ratio angle") between the rotational axis of each roller and the main axis. For convenience of description the ratio angle is considered as being zero when the rotational axis of a roller is normal to the main axis. It is impracticable to change the ratio angles of the rollers by direct action because the forces required are too great and it is known to offset changes of ratio angle by causing the rollers to steer themselves along helical paths along the toroidal surfaces of the discs until a desired ratio angle is attained. The condition necessary for a roller to steer itself to a different ratio angle in this way is that the roller rotational axis should cease to intersect the main axis. This may be brought about by tilting the roller about an axis passing through the points of contact between the roller and the two discs (this is hereinafter called "direct tilt angle rotation"). Alternatively it may be brought about by bodily translation of the roller from a position in which its rotational axis lies in a first plane which also contains the main axis, to a position in which the rotational axis of the roller lies in a second plane parallel to the first plane; this is hereinafter called "tangential shift" of a roller because the roller is translated laterally of the main axis substantially in the direction of the tangent at the roller centre to the circle which is the locus of the centre of the circle which forms the generator of the torus of which the toroidal surfaces of the two discs form parts. This locus circle is hereinafter called the "torus centre circle." In some known transmission units changes of ratio angle are initiated by a combination of direct tilt angle rotation and tangential shift of the rollers.

The present invention relates to a transmission unit in which the rollers are restrained from movement in the direct tilt angle rotation sense but are capable of movement in the tangential shift sense for the purpose of initiating a change of ratio angle.

It has been found that the roller is the limiting component of transmission units of the type described, from the point of view of fatigue life, and that, for a given stress level, the larger the diameter of the roller the larger the torque that can be transmitted. At the same time it is desirable to keep down the diameter of the discs as far as possible so as to keep down the overall bulk of the transmission unit. It is advantageous to make the diameters of the rollers as large as possible in relation to the diameter of the torus centre circle for another reason namely that it enables a given overall ratio range to be attained with a smaller range of ratio angles for the rollers. This is desirable, in that it reduces the stress levels, for a given duty required of the transmission unit, in the extreme ratios. Large ratio angles lead to high stress levels because the side of a roller contacting a disc at a small diameter is rolling upon a highly convex surface when the ratio angle is large whereas when the ratio angle is small the roller is rolling upon a surface which approximates more nearly to a flat surface. Furthermore at high ratio angles there is a "cosine effect" multiplication of the compressive "end loading" applied to the discs along the direction of the main axis, to keep the discs and rollers in driving engagement. Numerous methods of applying this end loading, in dependence on the torque transmitter to or by the transmission unit, have been proposed and some such methods can profitably exploit this cosine effect at one end of the ratio range but at the other end of the ratio range the cosine effect causes excessive compressive stresses at the roller and disc contact zones.

It might be thought that the ratio angles could equally well be reductd by increasing the roller diameter without restricting the diameter of the torus centre circle since the diameter of the torus generator circle (which determines the curvature of the disc faces) is equal to the roller diameter. This is not the case however because a certain ratio angle of a roller of a certain diameter determines the difference between the two disc diameters engaged by the two sides of the roller and to maximise the ratio this difference must be as large a proportion as possible of those two disc diameters.

For any given diameter of the torus centre circle if the diameter of the rollers is progressively increased it becomes progressively more difficult to accommodate the roller supporting structure because the gaps between adjacent rollers is progressively reduced. First it becomes necessary progressively to reduce the size of and finally eliminate rocker or pivot mechanisms for control of the attitudes of the rollers which may be in spaces between the edges of adjacent rollers in the plane of the torus centre circle and eventually these spaces become inadequate to accommodate even the spider arms of the fixed structure by which the roller control mechanism is supported. The object of the invention is to provide a solution of these problems.

As the size of the rollers is increased in relation to that of the discs it also becomes increasingly difficult to accommodate roller supporting and positioning means which extend outside the outer rim of a roller because such means extend beyond the margins of the discs and add to the bulk of the transmission unit as a whole. This problem becomes particularly acute in the case of a transmission unit having two outer discs coupled by two rollers or sets of rollers to two outwardly facing toroidal surfaces of a central disc. It is frequently required that the input shaft and the output shaft of the transmission unit shall be coaxial, and, short of a somewhat inelegant arrangement of gears and layshafts, it is necessary to couple the centre disc to the appropriate shaft by means of a bell or drum coupled to the outer rim of the centre disc and reaching over one of the outer discs and the roller or set of rollers through which it is coupled to the centre disc. Any extension of the roller supporting structure beyond the margins of the discs necessitates an enlargement of this drum and to accommodate the same the casing must be enlarged all round its periphery at one end.

According to the invention, therefore, there is provided a transmission unit of the type having coaxial driving and driven discs mounted for rotation about a main axis common to both discs and at least one roller providing a driving connection between facing toroidal surfaces of the discs, a mounting for the roller providing a hub upon which the roller may rotate about an axis extending in a generally radial direction from, and normally intersecting the main axis with freedom for the roller rotational axis to vary its inclination in relation to the main axis for variation of the transmission ratio between the driving and the driven disc the roller mounting comprising means for restraining the roller from rotation about an axis intersecting its points of contact with the discs but permitting bodily displacement of the roller transversely with respect to the main axis in a direction normal to the rotational axis of the roller and to the line joining the points of contact between the roller and the discs (such bodily displacement being hereinafter referred to as "tangential shift") means associated with the roller support means for positioning the roller and controlling motions of the roller in the tangential shift direction, which means pass into a hollow space within the said hub without occupying space beyond the outer edge of the roller which forms the running track of the roller upon the discs.

The space which can be provided within the hub of a roller is limited because the larger the hole through the centre of a roller the narrower the annular width of the roller and if this width is too narrow the roller will deform on application of the end load forcing the discs into driving engagement with the rollers. Therefore in the small space which can be provided it is somewhat difficult, (though not impossible) to accommodate purely mechanical devices for supporting and controlling the attitude of the roller.

It is preferred, therefore, that the means for moving the roller in the tangential shift sense should take the form of a fluid pressure operated actuator located within a hollow space within the roller hub.

To ensure equal distribution of driving action between the rollers they are preferably supported in such a way that the torque reaction thrusts to which they are subjected are resisted by means which permit any roller, which bears a heavier thrust than the others, to execute a tangential shift in a direction such as to initiate a ratio angle change towards a lower ratio. This may be brought about by referring the torque reaction thrusts of the rollers to a common thrust resisting means capable of producing differential tangential shift motions on the part of the rollers so that an overloaded roller tends towards a lower ratio and an underloaded roller tends towards a higher ratio. Alternatively the torque reaction thrust at the rollers may be resisted by forces which are equal for all the rollers so that a roller subjected to a torque reaction thrust exceeding the said force individually executes a tangential shift motion in a sense tending to lower its ratio and a roller subjected to a torque reaction thrust which is exceeded by the said force individually executes a tangential shift tending to raise its ratio. In this arrangement reliance is placed on the fact that the change of ratio undergone by a roller, as it proceeds, reduces or increases (as the case may be) the torque reaction thrust to which it is subjected so that it approaches equality with the said force.

The invention will be more readily understood from the following description of certain embodiments thereof illustrated in the accompanying drawings in which:—

Figure 1:
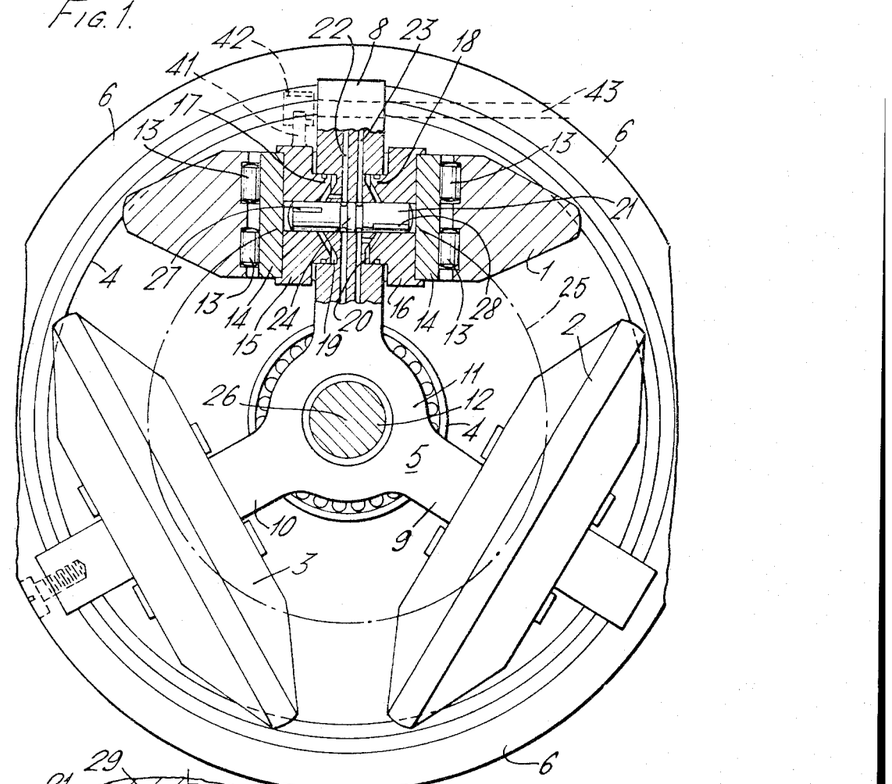
FIGURE 1 is a transverse section of a transmission unit according to the invention.

FIGURE 1 shows the three rollers 1, 2, and 3, of a set of rollers which transmit the torque from a driving disc, which is removed to reveal the rollers, and a driven disc 4 which is indicated by its inner and outer margins.

Figure 3:
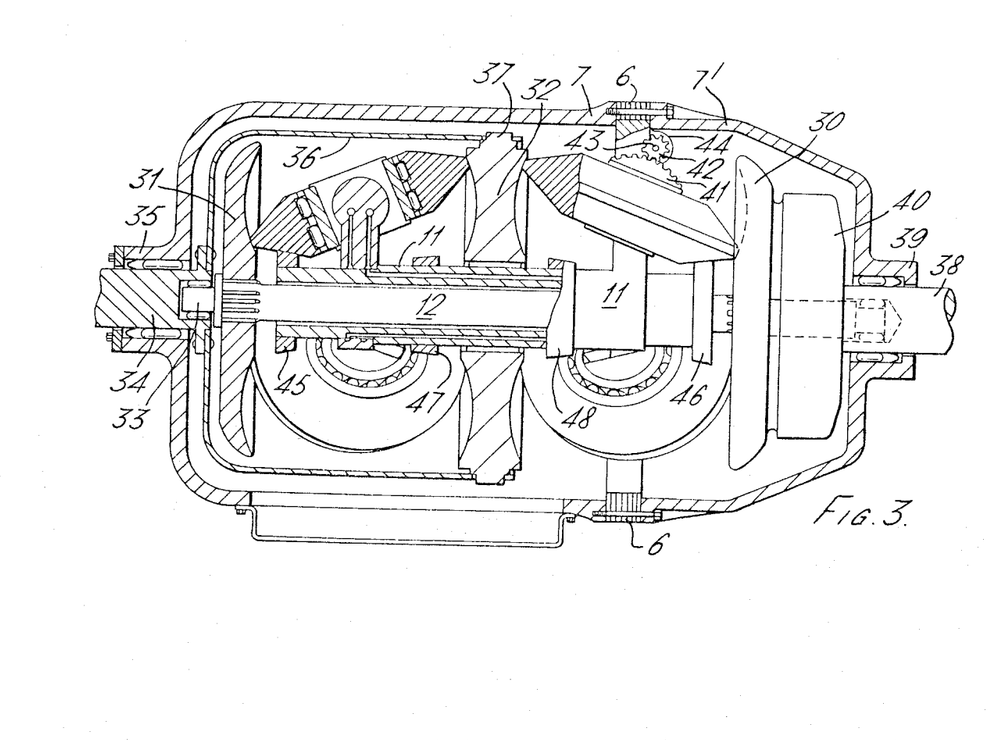
FIGURE 3 is a longitudinal section of a complete transmission unit using the assembly shown in FIGURE 1, FIGURES 4, 5 and 6 are sections in different planes of a part of an alternative design of transmission unit according to the invention.

A roller supporting structure, generally denoted 5, has an outer ring 6 by which it is anchored to the casing 7 (not shown in FIGURE 1 but indicated in FIGURE 3). Recessed into and extending radially inward from ring 6 are three spider arms 8, 9 and 10 which pass through the centres of rollers 1, 2 and 3 respectively and come together to a central sleeve 11 which surrounds the main shaft 12 to which the driving disc is secured.

The rollers and their positioning structures are identical. Only roller 1 is shown in section, therefore.

Roller 1 runs on roller bearing having rollers 13 and an inner race 14. Fitting within race 14 are two cheek pieces and 16 each of which is in the form of a segment of a cylinder. Projecting from the flat surfaces of cheek pieces 15 and 16 are cylindrical pistons 17 and 18 respectively, which project inwardly into cylindrical depressions 19 and 20 in spider arm 8.

Co-axially with pistons 17 and 18, cheek pieces 15 and 16 are bored right through to receive a gudgeon pin 21 which is a driving fit in a hole bored right through spider arm 8 co-axial with the cylindrical depressions 19 and 20, the inner end faces of which are of projecting conical form to give improved support for gudgeon pin 21.

Separate fluid passages 22 and 23 pass down spider arm 8, one branching into cylindrical depression 19 and the other into cylindrical depression 20.

Lips are formed on the curved edges of cheek pieces 15 and 16, which embrace the inner edges of race 14 to secure the latter against axial sliding upon the cheek pieces.

Gudgeon pin 21 restrains roller 1 from direct tilt angle rotation (i.e. rotation in the plane of the drawing about the roller centre 24), but permits rotation of the roller about the ratio angle axis (which lies in the plane of the drawing and is tangential, at roller centre 24, to the torus centre circle 25); it also permits a limited amount of tangential shift along the ratio angle axis by virtue of the clearance between the ends of gudgeon pin 21 and the inner surface of race 14.

Fluid under pressure is supplied via ducts 22 and 23 into the cylindrical depressions 19 and 20, exerting outward pressure against pistons 17 and 18. When the transmission unit is running under load the torque reaction applied to roller 1 tends to move it transversely along the ratio angle axis. For the roller to be in equilibrium its rotational axis must intersect the main axis 26 and for this equilibrium position to be maintained there must be a difference between the forces acting on the pistons 17 and 18 which exactly balances the torque reaction thrust applied to the roller. If the said thrust exceeds the said force difference, roller 1 will execute a tangential shift which will be in a direction such as to cause the roller to steer itself to a lower ratio. A single roller under these conditions would be subjected to a falling torque reaction thrust and the process would continue until the thrust fell slightly below the fluid pressure force difference as between pistons 17 and 18, whereupon the roller would revert to the equilibrium position but at a slightly lower ratio than previously. Conversely an underloaded roller tends to raise its ratio slightly.

In order that all rollers shall be capable of control in response to a change in the pressure difference as between their pistons (such as 17 and 18), it is necessary to adjust this pressure difference by means of a servo system having an input dependent on some desired criterion of performance such as the input speed, output speed or ratio, of the transmission unit. With such a system, if the fluid pressure force differences acting upon the rollers did not balance the torque reaction thrusts upon them the rollers would execute tangential shifts and commence to change ratio; this would affect the chosen control criterion which would operate through the servo system to change the pressure difference as between the two fluid lines until the torque reaction thrusts at the rollers was balanced by the fluid pressure force difference applied to the rollers through their pistons.

It has been indicated previously that an individual roller will lower its ratio if overloaded as compared with the other rollers and vice versa if underloaded. Assuming that the areas of pistons 17 and 18 are equal for all the rollers, all the rollers will be subjected to the same fluid pressure force difference at any one instant of time. Any roller for which this force difference is not in balance with the torque reaction thrust acting upon it will change ratio until balance is achieved. It follows therefore that all rollers will adjust their ratio angles individually until they are carrying equal torque reaction thrusts.

As soon as a roller executes the smallest tangential shift from its true equilibrium position, it will start to steer towards a new ratio angle and if not restored to the equilibrium position it will continue so to steer. In all normal conditions these tangential shift movements will be very small. It is possible however for oscillatory tangential shift motions to build up, particularly when the transmission unit is lightly loaded and it is therefore desirable to introduce damping. In the arrangement of FIG. 1 this is effected by cutting small grooves 27 and 28 in the cylindrical surface of gudgeon pin 22, which place the pockets at the ends of the gudgeon pin into communication with the respective cylindrical cavities 19 and 20. This not only adds the cross-sectional area of gudgeon pin 21 to the effective areas of pistons 17 and 18, but the necessity for transference of fluid to and fro along the grooves 27 and 28 provides viscous damping to the tangential shift motions of the roller.

Figure 2:
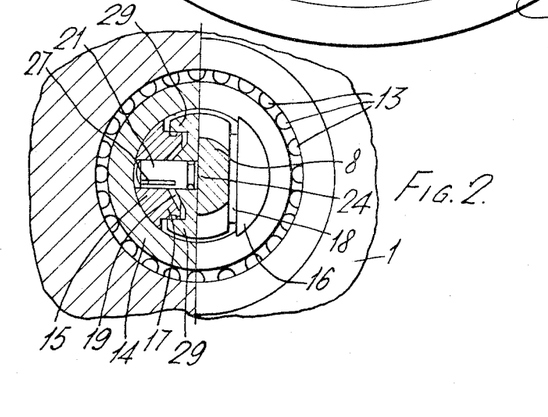
FIGURE 2 is a part-sectioned view of a part of the transmission unit shown in FIGURE 1.

FIG. 2 shows certain details of roller 1 and its positioning structure. On the left it is a section in a plane normal to the rotational axis of the roller and containing the roller centre 24 and on the right it is a section in a plane parallel to that plane but just above the roller as seen in FIG. 1.

It will be noted that the robust leg of the spider arm 8, as seen on the right, merges into the ring-like structure 29 which forms the surrounding wall of the cylindrical cavities 19 and 20. Below the roller the spider arm 8 resumes its former shape down to the point where it joins the central sleeve 11. This provides a rigid structure for resisting the torque reaction thrusts to which the roller is subjected.

It has been a disadvantage of a large number of former designs of transmission unit of the type described that they were capable of a change in the direction of rotation of the discs. This was due to the fact that the roller mountings were arranged so that roller, when displaced from its equilibrium position, regained equilibrium by virtue of the resulting change of ratio angle. One method of achieving this was to slant the ratio angle axis of the roller out of the plane containing the torus centre circle through an angle sometimes called a "camber angle" whereby, in executing a ratio angle change, the roller rotational axis had a component of motion towards the main axis.

Another method, sometimes referred to as the "tilt celling" method, provided a variable linkage in the mechanical connection from a control lever or the like whereby the relationship between the roller and the said lever or the like changed on a change of roller ratio angle so as to restore the roller to its former equilibrium position, the lever or the like remaining deflected. Such systems have the advantage that the rollers take up a unique ratio angle for each position of the main control lever, thus facilitating a purely positional mechanical ratio control construction but they have the disadvantage that the camber angle, or the sense of variability of the tilt cancelling linkage are appropriate only to one direction of rotation (which should not be confused with a change of direction of torque transmission through the transmission unit).

When neither camber angle nor tilt cancelling are provided, the rollers must be positively restored to their equilibrium positions after a change of ratio; otherwise they will continue to change ratio until the end stops are reached or the rollers run off the discs. Thus necessitates the use of a servo control system, as previously indicated, but as it is frequently necessary, in any event, to provide such a servo system where automatic adjustment of ratio is required, to match variable transmission conditions (e.g. speed, torque of input or load), little extra complexity of the transmission unit and its control system is involved if camber angle or tilt cancelling provision is omitted, whereas the advantage of rotational reversibility is reaped. A reversal of rotational direction necessitates a reversal of sign at some point in the servo system but this happens automatically where the source of pressurised fluid is a positive displacement pump.

It is therefore preferred to provide no camber angle in the embodiments of the invention herein described. This reduces the tangential shift excursions on the part of the rollers, for which provision need be made. Tilt cancelling is in general not appropriate to a fluid pressure roller control system though it is theoretically possible. In this connection it should be realised that the addition of a camber angle to a fluid pressure system for positioning the rollers does not alter the fact that a roller will continue to change ratio until its torque reaction thrust is in balance with the fluid pressure force resisting that thrust, it may however have an effect on the process by which equilibrium is attained in so much as a roller with a camber angle is moving towards an equilibrium position as its ratio angle changes, at the same time as equality between torque reaction thrust and fluid pressure force is being approached, whereas, without camber angle a roller will not move towards its equilibrium position until the torque reaction thrust falls below the fluid pressure force which implies that the ratio has changed a little too much and must be reversed. Under most practical conditions some very small residual inequality will always exist between the loads carried by the rollers or between the actual ratio attitudes of the rollers as a whole and that demanded by the ratio control system, due to friction inertia etc. and it will only rarely be desirable to provide camber angle in a fluid pressure roller control system. It is nevertheless within the scope of the invention in its broadest aspect that a camber angle may be provided. A practical limit for the camber angle is about 15°, in other words, the plane containing the ratio change axis of a roller should be inclined to the plane containing the main axis and the roller centre by an angle of at least 75°. For zero camber angle this inclination would, of course, be 90°. FIG. 3 shows the general arrangement of a complete transmission unit structurally similar to that described in relation to FIGS. 1 and 2, in which there are two sets of rollers co-operating with two pairs of toroidal races. There are two outer discs 30 and 31, splined to the main shaft 12, and a centre disc 32 having toroidal surfaces on both sides.

Main shaft 12 has at one end a spigot 33 which runs in needle roller bearings in the recessed end of a shaft 34 which passes through the end wall of the transmission unit casing 7 via a boss 35 containing needle roller bearings and an oil seal for shaft 34.

The end of shaft 34 within casing 7 has a flange to which is fixed a drum 36. Drum 36 encloses the disc 31 and the left hand set of rollers, and is notched at its right hand open end to engage dogs 37 machined on the outer rim of the centre disc 32.

The fixing ring 6 of spider 5 can be seen sandwiched between clamping flanges of casing 7 and another part casing denoted 7′.

Sleeve 11 of spider 5 is elongated and passes through the centre disc 32 which runs on needle roller bearings on sleeve 11. The left hand end of sleeve 11 provides support for a set of spider arms integral with a central collar which is splined to the end of sleeve 11. These spider arms are similar to the spider arms 8, 9 and 10 as shown in FIG. 1 except that they do not extend outwardly beyond the rollers.

FIG. 3 shows a slightly different arrangement of the fluid passages 22 and 23 as compared with that shown in FIG. 1. The fluid passages on the right hand spider are drilled right through to sleeve 11 in at least one of the spider arms, where they join two fluid passages drilled in the thickness of sleeve 11 and running longitudinally thereof. These longitudinal passages communicate with circumferential grooves in the inner surface of the central collar of the left hand spider, each radial arm of which has two fluid passages communicating with the circumferential grooves and passing outwardly to the two cylindrical depressions (such as 19 and 20 in FIG. 1) which position the rollers of the left hand set.

The right hand end of main shaft 12 terminates in a spigot supported by needle roller bearings in a cavity in a shaft 38 which passes through a boss 39 in part casing 7', in which are provided needle roller bearings and an oil seal for shaft 38. Shaft 38 is coupled to an end loading device 40 which may be of a known type having a preloading spring and a cam and roller arrangement applying an end load which varies with the torque between disc 30 and shaft 38.

Mention has been made above of the need for a servo system to control the fluid pressure by which the rollers are positioned. In one such system to be described the control criterion or "task completed" signal supplied as the feed-back signal to the servo system is derived from the actual ratio angle attitudes of the rollers. FIG. 3 shows one method of obtaining this feed back signal from one roller. It is sufficient to measure the ratio angle of a single roller since any inequality in the ratio angles of the roller due to correction of manufacturing inaccuracy by the load sharing equalisation action of the roller control arrangements, can be allowed for in the calibration of the ratio control servo system if necessary.

One of the cheek pieces 15, 16 associated with the roller in question carries a gear wheel segment 41 which mates with a pinion 42 mounted on a shaft 43 journalled in a lug 44 attached to the spider arm supporting the roller. This structure is also indicated in dotted lines in FIG. 1. Shaft 43 extends (inside or outside the casing) to a part of the servo system (e.g. a fluid valve).

The transmission unit illustrated in FIG. 3 can be used either with the shaft 34 as the input shaft and the shaft 38 as the output shaft, or vice versa, but it is necessary to design the end loading unit 40 to have the required characteristic according to whether it is subjected to output torque or input torque. Methods of providing for either of these two conditions are well known in the art and no detailed description is necessary herein.

When the rollers are positioned by fluid pressure means as in the embodiments of the invention so far described, it will usually be required that the pump or other source of fluid pressure should be driven from the input or output shaft of the transmission unit. If no fluid pressure reservoir is provided the normal roller positioning arrangements will be out of action when the transmission is starting from rest or slowing down to rest. In either case if the torque transmitted through the transmission unit is in the normal direction, the torque reaction being no longer supported by fluid pressure, the rollers will execute tangential shifts in the sense which will cause them to steer to low ratio positions. Conversely if there is a reversal of torque, which would for instance occur on switching off the prime mover, if the inertia of the driven load exceeded that of the prime mover so that the load was "over-running" the prime mover, the failure of fluid pressure would leave the rollers free to execute tangential shifts in the sense which causes them to steer to what are normally high ratio positions. Actually of course as the load is driving the prime mover, these positions of the rollers are low ratio positions, looked at from the output end of the transmissions unit.

There is no means of reversing the tangential shift motions which the rollers have thus executed so that they will continue to steer themselves to changed ratio angles indefinitely until the rollers run off the discs, unless specific preventive measures are taken to stop the rollers from continuing to change their ratio angles when they have reached the margins of the toroidal surfaces of the discs. Provision is made for this in the transmission unit illustrated in FIG. 3.

Sleeve 11 is extended outwardly from its junctions with the two sets of spider arms and arrestor rings 45 and 46 are pressed on to both extremities. Further arrestor rings 47 and 48 are pressed on to sleeve 11 between the two spider arm assemblies and the centre disc 32.

Let it be assumed that the input to the transmission unit is applied to disc 32 via shaft 34 and drum 36, so that the outer discs 30 and 31 are (normally) the driven members. In the absence of fluid pressure the rollers will execute tangential shifts in the low-ratio-seeking sense and the rollers will move towards ratio angles such as to bring their rolling tracks on the centre disc 32 towards the main axis. When the rollers approach closely to the inner margin of the toroidal tracks on centre disc 32, their conical flanks make contact with the stationary arrestor rings 47 and 48. This retards the rollers at points inboard of their rolling edges and applies to the rollers a couple which provides a force at each roller centre in the opposite direction to the tangential shift displacement and thus tending to restore the rollers to their equilibrium positions. If the rollers overshoot their equilibrium positions they will change ratio angle so as to leave arrestor rings 47 and 48, but immediately they do so any torque reaction to which they are subjected will cause them to move back towards the arrestor rings. Equilibrium will be established with the rollers lightly rubbing against the arrestor rings and slightly displaced from the true equilibrium rolling attitude.

Under reversed torque conditions the rollers move so that they approach the inner margins of the toroidal surfaces of the outer discs 30 and 31 and they eventually make contact with the other pair of arrestor rings 45 and 46 which operate in the same way as described above in relation to arrestor rings 47 and 48.

To increase the sensitivity of the action of the arrestor rings it may be arranged for there to be a high co-efficient of friction between their working surfaces and the flanks of the rollers.

Figure 4:
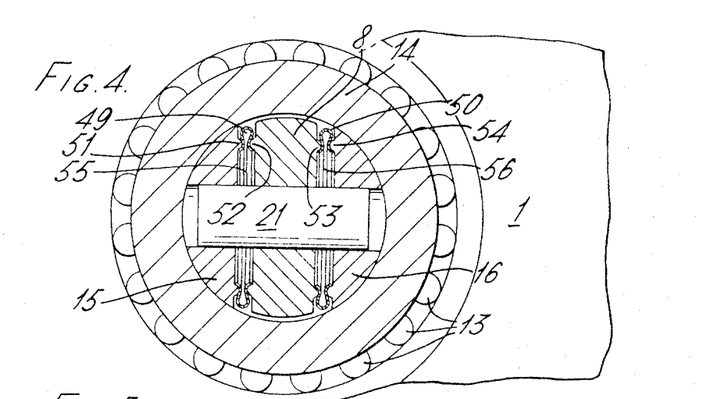
Figure 5:
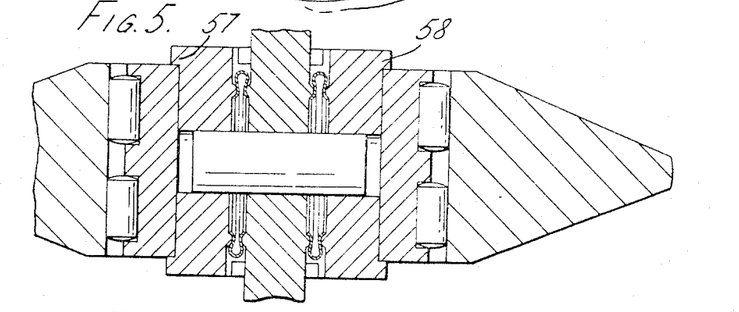
Figure 6:
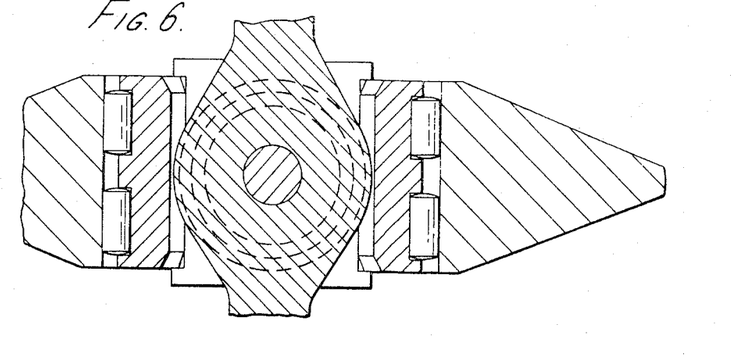

FIGS. 4, 5 and 6 show a modified construction for the fluid pressure roller positioning structure and the reference numerals used in FIGS. 1 and 2 are applied to corresponding items.

Check pieces 15 and 16 are again used and they fit into roller race 14 in the same way as do the cheek pieces of FIG. 1. The piston projections 17 and 18 are omitted however. Gudgeon pin 21 is again employed. There are no cylindrical depressions in spider arm 8. The fluid chambers are formed by spring rings 49 and 50. These rings resemble a single convolution of a metallic bellows as if cut with half of the outwardly turned bottom of the convolution retained at each side to form an outwardly turned lip at each side. The flat surface of each cheek piece and the adjacent flat surface of spider arm 8 have circular ridges 51 and 52, 53 and 54 formed upon them, cencentric with gudgeon pin 21. The lips of springs 49 and 50 engage these ridges and are thereby retained and located so as to define an expansible chamber (55, 56) on each side of spider arm 8 between the surface thereof and the flat surface of the adjacent one of the cheek pieces 15 and 16. The effective "piston" diameter of each of these chambers is the overall diameter of the spring ring (49 or 50) minus twice the thickness of the material of which the spring ring is made. The spring rings 49 and 50 exert sufficient outwards pressure upon cheek pieces 15 and 16 to retain the latter in place within race 14 in the absence of fluid pressure within the chambers 55 and 56 and the assembly is put together by mounting the cheek pieces 15 and 16 upon gudgeon pin 21, with spring rings 49 and 50 in position as shown. The cheek pieces are then squeezed together compressing spring rings 49 and 50 until the locating lips 57 and 58 on the outer curved edges of the cheek pieces can pass through the interior of race 14 to their correct positions therein whereupon the pressure is released.

This construction enables the maximum effective "piston" area to be obtained without weakening spider arm 8.

Figure 7:
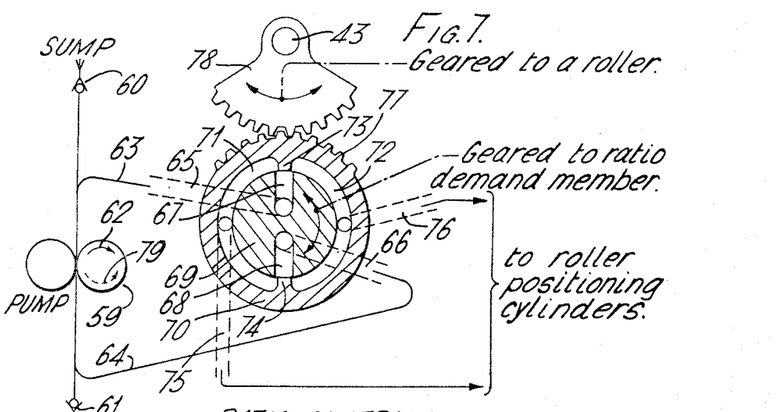
FIGURE 7 is a diagrammatic representation of a ratio control system for a transmission unit according to the invention.

FIG. 7 shows, diagrammatically, an hydraulic ratio control servo system in which the "task completed" signal is derived from the actual ratio attitude of the rollers.

A positive-displacement pump 59 draws fluid from a sump (not shown) via one or the other of the two check valves 60 or 61, according to its direction of rotation. If pump 59 is rotating in the direction indicated by solid line arrow 62, fluid line 63 will be the high pressure line and fluid line 64 the low pressure line. These two fluid lines 63 and 64 communicate via fluid passages 65 and 66 with ports 67 and 68, which latter ports extend radially outwards to the surface of a cylindrical inner rotary valve member 69.

Inner valve member 69 is surrounded by an outer rotary valve member 70 in the inner surface of which there are two semicircular grooves 71 and 72 which are in line, axially with ports 67 and 68. Grooves 71 and 72 are separated from one another by diametrically opposite lands 73 and 74 and are respectively in communication with fluid passages 75 and 76 one of which communicates with the roller positioning cylinders on one side of each roller and the other of which communicates with the roller positioning cylinders on the other side of each roller.

The inner valve member 69 is rotatable to set the valve to a "desired ratio" setting (by a hand wheel for instance). Outer valve member 70 has gear teeth 77 formed on a part of its periphery and these teeth mesh with gear teeth on a gear sector 78, mounted on (or otherwise coupled to) shaft 43 (see FIG. 3), so that the outer valve member 70 rotates in unison with the roller chosen to give the "task completed" indication. With the layout of FIG. 3, pinion 42 can make about one complete revolution from one extreme ratio to the other so that this layout, when combined with that of FIG. 7, calls for step down gearing of about 4:1 ratio between pinion 42 and sector 78.

The lands 73 and 74 are slightly narrower than the end ports 67 and 68. This gives an "underlap" which is somewhat exaggerated in FIG. 7. There will always be some flow of fluid from port 67 and into port 68 (with the pump 59 revolving as indicated by arrow 62) and the equilibrium condition under load will be such that the leak into groove 71 will exceed that into groove 72 by an amount dependent on the torque reaction thrust at the rollers. If it were not so the rollers would execute tangential shifts resulting in a ratio change which would rotate outer valve member 70 until balance was reached. It will be observed that for any given setting of inner valve member 69, which is connected to the ratio demand member of the system, the ratio will vary somewhat with variations in the torque transmitted by the transmission unit but as this movement cannot exceed the underlap of the lands 73, 74 these variations of ratio with torque can only be slight.

If valve member 69 is turned clockwise, groove 71 will be out of communication with port 67 and high pressure fluid will be cut off from the cylinders on the loaded sides of the rollers and the resulting ratio change will be toward a lower ratio causing sector 78 to revolve anti-clockwise and outer valve member 70 will thus follow up inner valve member 69 in the clockwise direction until land 73 is again straddled by port 67, whereupon an equilibrium ratio will again be established at a lower ratio, corresponding to the changed setting of inner valve member 69.

The corresponding process takes place when inner valve member is turned anticlockwise, resulting in a rise of ratio.

Land 74 and 68 duplicate the functions of land 73 and port 67 in reverse, as they provide the path through which fluid is evacuated from a roller positioning cylinder on the side to which the roller moves on executing a tangential shift and also a return path to the input side of pump 59 for fluid leaking from port 67 due to the underlap of land 73. It is of course preferable to make the roller positioning cylinders as nearly fluid-tight as possible yet it is necessary to provide for fluid to flow through the system to enable the pressures in the roller positioning cylinders to be controlled by a valve of this type. The best place to introduce this leakage flow is in the valve itself; hence the underlap of lands 73 and 74.

If the direction of rotation of the transmission unit is reversed, the direction of the torque reaction will also be reversed. Reversal of torque reaction, of itself, does not alter the action of the system except to cause a small change of ratio to shift lands 73 and 74 till the shares of the underlap margin as between the two controlling edges of each land, is reversed in sense. If the direction of rotation of the transmission unit is unaltered ratio angle changes will be in the same sense in relation to the tangential shifts of the rollers despite the direction of torque transmission and the direction of movement of outer valve member 70 will be the correct one for re-establishment of equilibrium on torque reversal. If the outer-valve member 70 moved the wrong way on torque reversal the pressure conditions in the roller positioning cylinders would be in the sense such as to aid the tangential shift movement of the rollers in the direction in which they would be urged by the reversed torque reaction, so that they would continue to change ratio and would run to the end stops, or off the disc tracks, with no means of restoring them to their equilibrium rolling attitudes. This does not happen when only the torque reaction is reversed but it does happen when the direction of rotation is reversed, because reversal of rotation reverses the sense of ratio angle change in relation to direction of tangential shift. On reversal of rotation, therefore, it is necessary to make a compensating sense reversal somewhere in the servo system. The simplest expedient for this purpose is to use a reversible pump for pump 59 and to drive it from one of the transmission unit shafts or from the prime mover or from the load. So connected, a reversible pump (rotating the direction shown by the dotted arrow 79) delivers fluid at high pressure to fluid line 64 rather than fluid line 63 and draws fluid from fluid line 63 rather than fluid line 64, and also from the sump via check valve 60 rather than check valve 61. This is as it should be for correct operation of valve 67/70 on reversal of the direction of rotation of the transmission unit.

If for some reason a reversible pump canot be used some alternative method of inserting a change of sense in the servo system must be restored to and in some applications of the invention a sense changing device under control of the means (e.g. a manual reverse lever) by which the direction of rotation of the prime mover is effected, will be acceptable. In this case the sense change could be effected by means of a reverse gear between pinion 42 (FIG. 3) and sector 78 (FIG. 7). Alternatively a change-over valve could be inserted in fluid lines 63 and 64.

Figure 8:
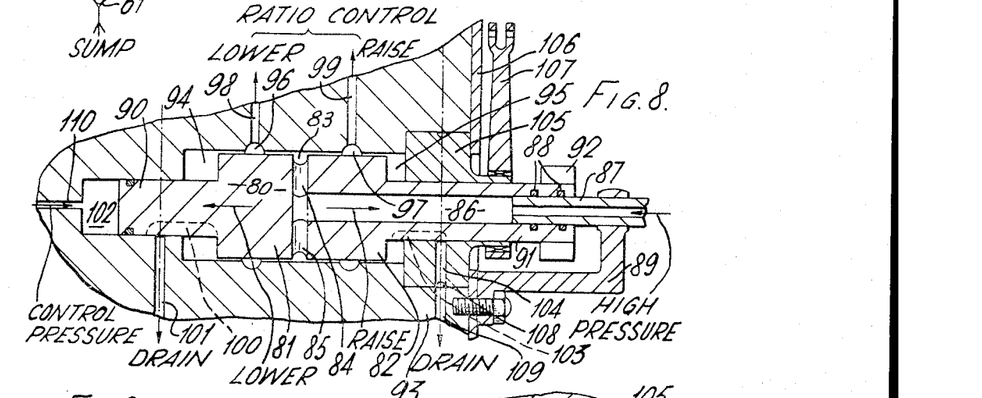
FIGURE 8 is a longitudinal section of a valve for use in an alternative ratio control system according to the invention.

FIG. 8 relates to a somewhat more sophisticated servo control system which would be suitable for a vehicle or like installation. As such an installation will not normally be required to reverse its direction of rotation, the system of FIG. 8 is not designed to provide this facility though the system could be modified to cater for reversed rotation if required.

A "positioned-controlled" system such as that of FIG. 7 can readily incorporate provision for preventing the rollers from being controlled beyond the limits of the ratio range attainable without running against the end stops (e.g. arrestor rings 45, 46, 47 and 48 of FIG. 3), by suitably limiting the angle through which inner valve member 69 can be rotated. The system of FIG. 8 however is designed to be responsive to a variable fluid pressure and since this cannot be limited in the same way, other provision is made to "end-stop" the rollers.

FIG. 8 shows a valve adapted to be controlled by fluid under pressure supplied by a pump connected to the input shaft to the transmission unit so that the control pressure will rise and fall with input speed. A further high pressure pump is provided as the source of pressurised fluid for positioning the rollers and the valve of FIG. 8 controls the application of this pressurised fluid to the roller positioning cylinders. The valve has a spool 80 with two high pressure controlling lands 81 and 82 of relatively large diameter, separated by a groove 83 which in turn communicates through radial drillings 84 and 85 with a central bore 86, in the spool 80, extending from drillings 84, 85 to the right hand end of spool 80. A high pressure fluid input pipe 87 enters the right hand end of bore 86 and is sealed therein by seals 88 which permit relative rotation and sliding between spool 80 and pipe 87. Pipe 87 is secured to the valve body as by a bracket 89.

The two ends of the spool extending from the lands 81 and 82 comprise a piston part 90 on the left and a shank part 91 on the right and a pinion 92 is formed on the end of shank part 91 outside the valve body. The central portion of the valve spool 80 which comprises the lands 81 and 82 is accommodated with a small radial clearance in an enlarged bore of the valve body 93 and this bore is long enough to permit axial movement of lands 81 and 82 and to provide end pockets 94 and 95 into which these lands may respectively move.

Two circumferential grooves 96 and 97 are cut in the inner surface of the said enlarged bore in valve body 93 and when lands 81 and 82 are central in the bore these two grooves are respectively at about the middle of the lands. Grooves 96 and 97 respectively communicate through ports 98 and 99 with the roller positioning cylinders. Port 98 communicates with the roller positioning cylinders on the sides of the rollers from which the rollers must move to lower the transmission unit ratio and port 99 with the cylinders from which the rollers must move to raise the transmission unit ratio.

Pinion 92 is coupled in any convenient way to roller ratio angle indicating means such as sector 41 and pinion 42 (shown in FIG. 3) so that spool 80 rotates through a convenient angle—say about 120°—when the rollers rotate over the complete permissible ratio angle range.

The piston part 90 of spool 80 has a depression 100 cut from its cylindrical surface which depression is of an axial length such that it communicates with pocket 94 and extends to the left as far as a port 101 extending radially through the valve body 93, from a cylindrical bore 102 embracing pitson part 90 of spool 80 to discharge into the sump or drain of the fluid supply circuit. Depression 100, at least in the region of port 101, occupies an arc of the circumference of piston part 90 such that at one extreme of rotation of spool 80 it passes out of communication with port 101.

Shank portion 91 of spool 80 has a similar depression 103 communicating with pocket 95 and extending to the left to the region of a port 104 which extends radially from the bore of a boss 105, surrounding the shank part 91, boss 105 being accommodated in an enlarged bore in the right hand end of the valve body 93. Boss 105 is free to rotate but is retained in its bore in the valve body by means of a cover plate 106. A lever 107 fixed to a rightward extension of boss 105, which passes thorugh a hole in cover plate 106, enables boss 105 to be rotated.

Port 104 communicates with a circumferential groove 108 around the outer surface of boss 105 and groove 108 in turn communicates with a port 109 extending radially through valve body 93 and discharging into the sump or drain of the fluid supply circuit.

Depression 103, at least in the region of port 104 occupies an arc of the circumference of shank part 91 such that, at the opposite extreme of rotation of spool 80 (as compared with depression 100) it passes out of communication with port 104.

Figure 9:
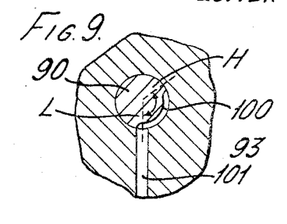
FIGURES 9 and 10 are cross-sections of parts of the valve of FIGURE 8.

The construction of depression 100 and port 101 is apparent in FIG. 9 which is cross-section of the valve of FIG. 8 in the region of port 101. Likewise the construction of depression 103, boss 105, port 104, groove 108 and port 109, is apparent from FIG. 10 which is a cross-section of the valve of FIG. 8 in the region of ports 104 and 109.

Beyond the left hand end of piston part 90 of spool 80, bore 102 is supplied with fluid at the variable ratio control pressure via a presure 110.

High pressure fluid entering bore 86 from pipe 87, passes into groove 83 via drillings 84 and 85 and thence in both directions, via the clearance around lands 81 and 82 into pockets 94 and 95 from which, for intermediate parts of the range of rotation of spool 80, it escapes through depression 100 and port 101, and through depression 103, port 104, groove 108 and port 109, to the sump or drain of the fluid supply circuit. If spool 80 moves to the left groove 96 comes nearer to the high pressure side of the leakage path past land 81 so that the pressure in port 98 rises; groove 97 on the other hand comes nearer to the low pressure side of the leakage path past land 82 so that the pressure in port 99 falls. This results in a fall in the ratio of the transmission unit.

Conversely a movement of spool 80 to the right results in a rise in the ratio of the transmission unit.

Spool 80 is urged to the left by the high pressure fluid in bore 86, effective over the cross-sectional area of bore 86 and this force is balanced by the control pressure fluid acting on piston part 90, when the system is in equilibrium. Variations in this control pressure result in axial movement of spool 80 which would force the spool to the end of its range of travel but for the fact that the resulting change in the ratio of the transmission unit reacts upon the control fluid pressure to bring it again into balance with the pressure acting against the end of bore 86. For instance suppose that the ratio rises, by virtue of a move to the right of spool 80 resulting from a rise in the control fluid pressure in cylinder 102, caused in turn by a rise in the speed of the input shaft to the transmission unit. The rise in ratio would throw an increased load on the prime mover and slow it down. A fall in the control fluid pressure would ensue and the forces acting axially upon spool 80 would again be in equilibrium but with spool 80 in a changed position. There would be in increase in the torque reaction at the rollers and the changed pressures in ports 98 and 99 would balance this. If this was not so the rollers would continue to change ratio still further loading the prime mover, and still further lowering the control fluid pressure until valve 80 had moved to a position at which the pressure conditions in ports 98 and 99 were such as to balance the torque reaction at the rollers.

The performance of the system as a whole can be controlled by an operator by means which raise or lower the control fluid pressure for any given speed of the control fluid pump, for instance by means of a variable bleed valve connected to a demand member. As the system, according to the previous description tends to control the ratio in such a way that the speed of the prime mover is held constant, it follows that this equilibrium speed is changed if the relationship between control fluid pressure and control fluid pump speed is changed. When this relationship is changed by operation of the demand member, the latter operates as a prime mover speed demand member.

With lever 107 in its normal position as shown in FIG. 8, if the rollers approach their extreme high ratio attitudes spool 80 is rotated through pinion 92 until depression 103 moves out of communication with port 104 so that pocket 95 can no longer drain away. Pressure then builds up in pocket 95 driving spool 80 to the left and a fall of the ratio is initiated. This rotates spool 80 so that depression 103 again starts to uncover port 104 and finally an equilibrium is established with the rollers just short of the highest ratio position, with port 104 partly obstructed by the lip of depression 103 and with the pressure in pocket 95 sufficiently above atmospheric pressure (as assumed to obtain in pocket 94) to balance the excess of the force acting on piston part 90 over the force acting against the end of bore 86.

It will be appreciated that this equilibrium ceiling ratio could be established at any chosen ratio if the angular position of port 104 was adjustable in relation to the lip of depression 103. Such adjustment may be effected by rotation of boss 105 (clockwise in FIG. 10) by means of lever 107. This facility is generally required in a vehicle installation to enable the friction of the prime mover to be used to assist normal wheel brakes, a facility which is commonly known as "engine braking." The facility also provides an operator-controlled ratio-override facility which is sometimes called for.

Figure 10:
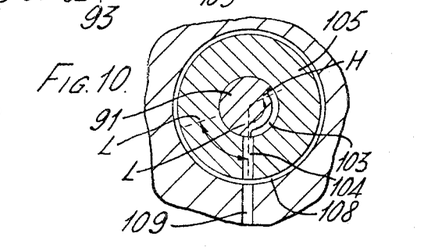

At the other extreme low ratio end of the ratio range of the transmission range depression 100 co-operates with port 101 in an analogous manner but in reversed sense, as described above in relation to depression 103 and port 104, when boss 105 is in its normal setting as shown in FIGS. 8 and 10.

The pressure in pocket 94 or pocket 95, as the case may be, must not be allowed to build up to the full high pressure as obtains in groove 84 or there will be no pressure drop across the land 96 or 97 as the case may be and axial movements of spool 80 will not be effective to control the pressures in fluid passages 98 and 99. This situation will not arise however, as spool 80 will start to move as soon as a relatively small pressure build up takes place in the end pocket 94 or 95, as the case may be, and this movement of spool 80 and the resulting ratio change will arrest the end pocket pressure build-up by rotation of spool 80. There will however be some disturbance of the pressure balance conditions due to the end pocket pressure build-up and this will be in a sense such as to make the pressure in the fluid passage (98 or 99 as the case may be), somewhat higher than it would normally be for a given position of the appropriate land of spool 80, and this applies to the fluid passage in which the pressure should be lowered to prevent the rollers from running off the discs or contacting the mechanical end stops in the transmission unit. This is of no consequence in practice because the spool 80 makes a corrective action by moving slightly further from the pocket in which the pressure build-up takes place, than it would but for the said disturbance of the pressure balance conditions.

We claim:

1. A transmission unit of the type having coaxial driving and driven discs mounted for rotation about a main axis common to both discs and at least one roller providing a driving connection between facing toroidal surfaces of the discs, a mounting for the roller providing a hub upon which the roller may rotate about an axis extending in a generally radial direction from, and normally intersecting the main axis with freedom for the roller rotational axis to vary its inclination in relation to the main axis for variation of the transmission ratio between the driving and the driven disc the roller mounting comprising means for restraining the roller from rotation about an axis intersecting its points of contact with the discs but permitting bodily displacement of the roller transversely with respect to the main axis in a direction normal to the rotational axis of the roller and to the line joining the points of contact between the roller and the discs (such bodily displacement being hereinafter referred to as "tangential shift") means associated with the roller support means for positioning the roller and controlling motions of the roller in the tangential shift direction, which means pass into a hollow space within the said hub without occupying space beyond the outer edge of the roller which forms the running track of the roller upon the discs.

2. A transmission unit as claimed in claim 1 in which the said roller positioning and controlling means comprises at least one fluid-pressure-operated actuator.

3. A transmission unit as claimed in claim 2 in which the said actuator is wholly accommodated within the said hub.

4. A transmission unit as claimed in claim 2 in which the said roller positioning and controlling means includes a fluid pressure servo system comprising a source of fluid under pressure a valve with co-operating valve parts, one coupled to a roller positioning actuator to change the attitude of that valve part when a change of ratio takes place, the other coupled to a demand member, at least one port in the valve communicating with the said fluid-pressure-operated actuator at least one port in the valve member coupled to the fluid pressure source, a movement of the demand member altering the relative positions of the valve parts in a manner such as to operate the actuator to position the roller in a direction to initiate a change of ratio, the resulting change of ratio acting upon the other valve member in the sense to restore the two valve members to their initial relative positions.

5. A transmission unit as claimed in claim 4 in which the demand member has a normal position in which it is not effective upon the relative positions of the valve parts, from which normal position it can be moved to any point in a range of active positions in which the valve part coupled to the roller is positioned in relation to the other valve part in a manner such that, when in the course of a change of ratio a certain ratio corresponding with a certain setting of the demand member, is reached, the actuator is operated in the sense tending to reverse the direction of the change of ratio on the part of the roller whereby the roller is prevented from changing ratio beyond a ratio characteristic of that particular position of the demand member.

6. A transmission unit as claimed in claim 2 in which the said roller positioning and controlling means includes a fluid pressure servo system comprising a source of fluid under pressure, a valve with at least one output port coupled to a roller positioning actuator, at least one pressure port coupled to the said fluid pressure source and at least one drain port coupled to a point of low pressure in the system, the valve having two co-operating valve parts movable relative to one another in two modes and arranged to provide a high resistance path between the pressure port and the drain port the output port being arranged to communicate with an intermediate position in the said high resistance path which position is varied when the valve parts move relative to one another in the first of the two modes a chamber, defined by surfaces of the two valve parts, and interposed between the high resistance path and the drain port a land on one of the valve parts adapted on relative movement of the two valve parts in the second of the two modes to cut off communication between the chamber and the drain port at one extreme at least of the range of permissible relative motion of the two valve parts in the second mode a mechanical coupling between the roller mounting and one of the valve parts to produce relative motion between the valve parts in the second mode when the roller changes its ratio attitude such connection being so adjusted that communication is cut off as aforesaid when the roller approaches one extreme of its ratio attitude range, whereupon fluid pressure builds up in the chamber and acts upon surfaces of the valve parts defining the chamber in a manner such as to move the valve parts relative to one another in the first mode in that direction which varies the pressure at the output port in the sense tending to control the roller positioning actuator to initiate a ratio change on the part of the roller, away from the said extreme of its ratio attitude range.

7. A transmission unit as claimed in claim 6 having a third valve member adjustable to vary the point in the relative motion, in the second mode, of the two first-mentioned valve parts, at which the chamber is cut off from communication with the drain port whereby the roller can be checked from changing ratio at an intermediate point, in its ratio attitude range, characteristic of the adjustment setting of the third valve part.

8. A transmission unit as claimed in claim 1 in which the roller mounting comprises a pivot bearing for the hub whereby the roller is supported for inclination about a ratio change axis passing through the roller centre and being in a plane inclined by at least 75° to the plane containing the roller centre and the main axis, the roller centre being defined as a point on the roller rotational axis between two planes respectively containing the two margins of the running track of the roller upon the discs.

9. A transmission unit as claimed in claim 8 in which the roller mounting comprises an arm anchored to fixed parts of the transmission unit the said arm extending within the said hub, an axle pin supported in the said arm and, anchored to the said hub at either side of the said arm, two bearing pieces each apertured to receive an end of the axle pin.

10. A transmission unit as claimed in claim 9 in which at least one of the ends of axle pin, together with the cheek piece within which it is received, together form a chamber the volume of which varies on execution of tangential shift motions of the roller means for supplying the chamber with fluid and an escape path from the chamber which presents a high resistance to the flow of fluid.

11. A transmission unit as claimed in claim 10 in which the said arm and the said cheek piece are formed to provide between them a fluid-pressure-operated actuator for positioning and controlling the roller as aforesaid and in which a high resistance path is provided between the interior of the actuator and the said chamber whereby the chamber acts both to augment the action of the actuator and to damp the same.

12. A transmission unit as claimed in claim 8 in which the roller mounting comprises an arm anchored to fixed parts of the transmission unit, the said arm extending within the said hub, cheek pieces within and anchored to the hub at least one of which is formed to provide one element of a piston and cylinder assembly whilst the arm is formed to provide the other element of the said assembly which elements co-operate to form a fluid-pressure-operated actuator for positioning and controlling motions of the roller in the tangential shift direction.

13. A transmission unit as claimed in claim 8 in which the roller mounting comprises an arm anchored to fixed parts of the transmission unit, the said arm extending within the said hub cheek pieces within and anchored to the hub, outer faces of the arm and inner faces of the cheek pieces having surfaces in planes normal to the ratio change axis spaced apart on each side of the arm, axially compressible rings one disposed on each side of the arm between a pair of the said spaced-apart surfaces means for providing a fluid tight seal between each ring and the surfaces on a cheek piece and the arm between which it lies and means for introducing fluid under pressure between those surfaces within the ring, whereby a fluid-pressure-operated actuator is provided on each side of the arm.

14. A transmission unit as claimed in claim 13 with means for locating each of the sealing rings coaxial with the ratio change axis.

15. A transmission unit as claimed in claim 1 with a stop member anchored to fixed parts of the transmission unit in a position, between the main axis and the roller and nearer to one disc than to the other such that the flank of the roller makes contact with it when the running track of the roller, at one extreme ratio position where the track approaches the inner margin of the toroidal surface of the disc which is nearest to the stop member, the position on the roller which makes contact with the stop member being in-board of the running track of the roller whereby, when such contact takes place friction between the flank of the roller and the stop member produces a couple tending to produce a tangential shift displacement of the roller in the sense which induces a change of ratio angle inclination on the part of the roller such as to cause the said flank of the roller to move out of contact with the stop member.

16. A transmission unit as claimed in claim 1 in which there are three rollers symmetrically arranged around the main axis to provide three driving connections in parallel between two opposed toroidal surfaces of a driving and a driven disc respectively and in which the roller mountings comprise a three-armed spider member anchored to fixed parts of the transmission unit one of such three arms extending within the hub of each roller and no part of such spider member extending into a space between the running tracks of adjacent rollers.

17. A transmission unit as claimed in claim 16 in which at least one of the spider arms extends radially outward from the roller hub into which it passes and is anchored at its radially outer end to a fixed part of the transmission unit containing the moving parts thereof, with fluid passages in such arm for the supply and escape of fluid under pressure to and from fluid-pressure-operated actuators acting as the roller positioning and control means.

References Cited by the Examiner
UNITED STATES PATENTS

| | | | |
|---|---|---|---|
| 3,008,337 | 11/1961 | Kraus | 74—200 |
| 3,142,189 | 7/1964 | Davis et al. | 74—200 |
| 3,142,190 | 7/1964 | Kelsey et al. | 74—200 |
| 3,164,025 | 1/1965 | Francisco | 74—200 |

DAVID J. WILLIAMOWSKY, *Primary Examiner.*

L. H. GERIN, *Assistant Examiner.*